United States Patent
Luoma et al.

(10) Patent No.: US 9,313,800 B2
(45) Date of Patent: Apr. 12, 2016

(54) METHOD AND APPARATUS FOR OPTIMIZING ENERGY CONSUMPTION FOR WIRELESS CONNECTIVITY

(75) Inventors: Kristian Andreas Luoma, Kiviniemi (FI); Jukka Sakari Alakontiola, Oulu (FI); Eero Tapani Lepisto, Oulu (FI); Tero Mikael Halla-Aho, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 1755 days.

(21) Appl. No.: 12/490,244

(22) Filed: Jun. 23, 2009

(65) Prior Publication Data

US 2010/0322124 A1    Dec. 23, 2010

(51) Int. Cl.
- *H04W 72/12* (2009.01)
- *H04W 52/02* (2009.01)
- *H04W 76/04* (2009.01)

(52) U.S. Cl.
CPC ...... *H04W 72/1242* (2013.01); *H04W 52/0225* (2013.01); *H04W 76/045* (2013.01); *Y02B 60/50* (2013.01)

(58) Field of Classification Search
CPC ... H04B 1/1607; G08B 29/181; H04W 52/02; H04W 88/022
USPC .......... 455/343.1, 343.2, 343.3, 343.4, 343.5, 455/343.6, 412.1, 412.2; 370/311
See application file for complete search history.

(56) References Cited

U.S. PATENT DOCUMENTS

| | | | |
|---|---|---|---|
| 6,009,325 A * | 12/1999 | Retzer | H04W 76/04 455/434 |
| 6,912,402 B1 | 6/2005 | Haumont et al. | |
| 7,058,054 B2 * | 6/2006 | Abdollahi et al. | 370/392 |
| 7,088,698 B1 | 8/2006 | Harsch | |
| 7,149,556 B2 * | 12/2006 | Angelo | G06F 21/35 455/127.5 |
| 7,460,556 B2 * | 12/2008 | Duggirala | H04L 29/06 370/465 |
| 7,558,876 B2 * | 7/2009 | Wu | 709/238 |
| 7,573,867 B1 * | 8/2009 | Welch | H04W 76/045 370/352 |
| 7,634,558 B1 * | 12/2009 | Mangal | H04L 67/24 709/224 |
| 7,672,264 B2 * | 3/2010 | Babin | H04L 29/12471 370/318 |
| 7,684,346 B2 * | 3/2010 | Valli | H04L 43/10 370/252 |
| 7,698,409 B2 * | 4/2010 | Kohonen | H04W 76/045 455/343.1 |
| 7,710,931 B2 * | 5/2010 | Islam | H04W 80/04 370/328 |
| 7,715,334 B2 * | 5/2010 | Harsch | 370/311 |

(Continued)

FOREIGN PATENT DOCUMENTS

| EP | 1 724 983 A1 | 11/2006 |
|---|---|---|
| WO | WO 2008/019478 A1 | 2/2008 |
| WO | WO 2008/033805 A2 | 3/2008 |

OTHER PUBLICATIONS

Eronen, P.: TCP Wake-Up: Reducing Keep-Alive Traffic in Mobile IPv4 and IPsec NAT Traversal. Nokia Research Center, 1-10 (2008).

(Continued)

*Primary Examiner* — Hai V Nguyen
(74) *Attorney, Agent, or Firm* — Alston & Bird LLP

(57) ABSTRACT

An approach is provided for optimizing energy consumption for wireless always-on connections. A radio management module buffers non-real time data and schedules the transmission of the non-real time data by a wireless device. The module also determines a communication type for carrying the non-real time data and initiates transmission of the non-real time data based on the schedule and the determined communication type.

11 Claims, 12 Drawing Sheets

(56) References Cited

U.S. PATENT DOCUMENTS

| | | | |
|---|---|---|---|
| 7,720,989 B2* | 5/2010 | Dunk | H04L 67/14 709/224 |
| 7,756,155 B2* | 7/2010 | Duggirala | H04L 29/06 370/465 |
| 7,864,778 B2* | 1/2011 | Lee et al. | 370/395.4 |
| 7,881,318 B2* | 2/2011 | Herzog | H04L 61/2553 370/401 |
| 7,885,616 B2* | 2/2011 | Plestid | H04W 52/0251 370/311 |
| 7,961,736 B2* | 6/2011 | Ayyagari | 370/395.3 |
| 7,978,630 B2* | 7/2011 | Bengtsson | H04L 29/12471 370/254 |
| 7,991,870 B1* | 8/2011 | Allred | H04L 29/125 709/223 |
| 8,023,432 B2* | 9/2011 | Herzog | H04L 29/1233 370/254 |
| 8,073,964 B2* | 12/2011 | Dunk | H04L 67/14 709/224 |
| 8,077,647 B2* | 12/2011 | Wentink | H04W 48/16 370/311 |
| 8,228,830 B2* | 7/2012 | Babin | H04W 40/02 370/311 |
| 8,326,985 B2* | 12/2012 | Luna | H04L 67/145 370/311 |
| 8,369,254 B2* | 2/2013 | Sood | H04L 12/66 370/311 |
| 8,385,242 B2* | 2/2013 | Huoviala | H04W 52/0258 370/311 |
| 8,477,761 B2* | 7/2013 | Prasad | H04M 7/0072 370/352 |
| 8,528,066 B2* | 9/2013 | Fusari | G06F 17/30893 726/12 |
| 2002/0133596 A1* | 9/2002 | Border | H04B 7/18582 709/227 |
| 2003/0128676 A1 | 7/2003 | Lee | |
| 2004/0185857 A1* | 9/2004 | Lee | H04B 1/707 455/445 |
| 2005/0237973 A1 | 10/2005 | Takeda et al. | |
| 2006/0171310 A1 | 8/2006 | Ahluwalia et al. | |
| 2006/0182141 A1* | 8/2006 | Duggirala | H04L 29/06 370/465 |
| 2006/0271684 A1 | 11/2006 | Booth et al. | |
| 2007/0135080 A1* | 6/2007 | Islam | H04W 52/0251 455/343.1 |
| 2007/0140159 A1* | 6/2007 | Eronen | H04L 12/12 370/328 |
| 2007/0238437 A1* | 10/2007 | Jaakkola | 455/343.1 |
| 2007/0238438 A1* | 10/2007 | Alon et al. | 455/343.2 |
| 2007/0268127 A1* | 11/2007 | Rittle et al. | 340/539.22 |
| 2007/0297415 A1 | 12/2007 | Lee et al. | |
| 2007/0298848 A1* | 12/2007 | Babin | H04L 29/12471 455/574 |
| 2008/0039032 A1* | 2/2008 | Haumont | H04W 8/22 455/115.1 |
| 2008/0045277 A1* | 2/2008 | Plestid | H04W 52/0251 455/574 |
| 2008/0059582 A1* | 3/2008 | Hartikainen | H04L 67/14 709/204 |
| 2008/0154913 A1* | 6/2008 | Kohonen | H04W 76/045 |
| 2008/0186909 A1 | 8/2008 | Kim et al. | |
| 2008/0209068 A1* | 8/2008 | Herzog | H04L 61/2553 709/232 |
| 2008/0232285 A1* | 9/2008 | Aad et al. | 370/310 |
| 2008/0267148 A1 | 10/2008 | Speight | |
| 2008/0307100 A1* | 12/2008 | Duggirala | H04L 29/06 709/228 |
| 2009/0003208 A1* | 1/2009 | Payyappilly | H04W 76/045 370/230.1 |
| 2009/0003319 A1* | 1/2009 | Sood | H04L 12/66 370/352 |
| 2009/0175225 A1* | 7/2009 | Bi | H04W 74/0841 370/329 |
| 2009/0248878 A1 | 10/2009 | Tran et al. | |
| 2009/0319670 A1* | 12/2009 | Kang | H04M 1/00 709/227 |
| 2010/0214975 A1* | 8/2010 | Kwak | H04L 63/08 370/328 |
| 2010/0215133 A1* | 8/2010 | Stebbings et al. | 375/354 |
| 2010/0260148 A1* | 10/2010 | Huoviala | H04W 52/0258 370/335 |
| 2010/0278101 A1* | 11/2010 | Bengtsson | H04L 29/12471 370/328 |
| 2011/0179183 A1* | 7/2011 | Lindsay | 709/227 |
| 2012/0331087 A1* | 12/2012 | Luna | H04L 67/145 709/213 |
| 2013/0060927 A1* | 3/2013 | Park | H04L 67/322 709/223 |
| 2014/0051485 A1* | 2/2014 | Wang | H04B 7/2656 455/574 |

OTHER PUBLICATIONS

Haverinen, H., Siren, J., Eronen, P.: Energy Consumption of Always-On Applications in WCDMA Networks (Abstract). Vehicular Technology Conference 2007, Dublin, Ireland, 964-968 (2007).

International search report and written opinion for corresponding international application No. PCT/IB2010/052837 dated Oct. 20, 2010, pp. 1-18.

International Preliminary Report on Patentability for related International Patent Application No. PCT/IB2010/052837 dated Jan. 12, 2012, pp. 1-12.

Office Action for related Russian Patent Application No. 2012101865 dated Feb. 27, 2013, pp. 1-5.

Office Action for Chinese Application No. 2015031801044680 dated Mar. 23, 2015, 7 pages.

Patent Examination Report No. 1 for Australian Patent Application No. 2010264102, dated May 29, 2013, pp. 1-4.

Chinese Office Action for corresponding Chinese Application No. 201080028444.6, dated Jul. 2, 2014, Partial English language translation and English language Summary, 8 pages.

Office Action for corresponding Chinese Application No. 201080028444.6 dated Sep. 29, 2015.

Korean Office Action with English Summary for corresponding Patent Application No. 10-2011-7030730 dated Oct. 23, 2013, 4 pages.

* cited by examiner

METHOD AND APPARATUS FOR OPTIMIZING ENERGY CONSUMPTION FOR WIRELESS CONNECTIVITY

BACKGROUND

Wireless (e.g., cellular) service providers and device manufacturers are continually challenged to deliver value and convenience to consumers by, for example, providing compelling network services, applications, and content. One area of development is the creation of services and applications with persistent wireless (e.g., "always-on") connectivity to a data network (e.g., the Internet). Providing such always-on connectivity, however, taxes the power systems of mobile devices operating with limited power sources (e.g., batteries). In particular, persistent connections demand greater activity from the radio which, in turn, requires greater battery consumption. Therefore, to be competitive and encourage the use of these types of services and applications, the service providers and device manufacturers need to address the ever growing requirement for more approaches for efficient energy management on mobile devices.

SOME EXAMPLE EMBODIMENTS

According to one embodiment, a method comprises buffering non-real time data for transmission over a radio network. The method also comprises scheduling transmission of the non-real time data by a wireless device. The method further comprises determining a communication type for carrying the non-real time data. The method further comprises initiating transmission of the non-real time data based on the scheduling and the determined communication type.

According to another embodiment, an apparatus comprising at least one processor, and at least one memory including computer program code, the at least one memory and the computer program code configured to, with the at least one processor, cause the apparatus to buffer non-real time data for transmission over a radio network. The apparatus is also caused to schedule transmission of the non-real time data by a wireless device. The apparatus is further caused to determine a communication type for carrying the non-real time data. The apparatus is further caused to initiate transmission of the non-real time data based on the scheduling and the determined communication type.

According to another embodiment, a computer-readable storage medium carrying one or more sequences of one or more instructions which, when executed by one or more processors, cause an apparatus to designate a common keep-alive message to buffer non-real time data for transmission over a radio network. The apparatus is also caused to schedule transmission of the non-real time data by a wireless device. The apparatus is further caused to determine a communication type for carrying the non-real time data. The apparatus is further caused to initiate transmission of the non-real time data based on the scheduling and the determined communication type.

According to another embodiment, an apparatus comprises means for buffering non-real time data for transmission over a radio network. The apparatus also comprises means for scheduling transmission of the non-real time data by a wireless device. The apparatus further comprises means for determining a communication type for carrying the non-real time data. The apparatus further comprises means for initiating transmission of the non-real time data based on the scheduling and the determined communication type.

According to another embodiment, a method comprises receiving a common keep-alive message, the common keep-alive message representing a plurality of keep-alive messages corresponding respectively to a plurality of applications. The method further comprises initiating reset of a keep-alive timer corresponding to the plurality of applications based on reception of the common keep-alive message. The keep-alive timer tracks a maximum time interval between data transmissions to maintain one or more data connections for the plurality of applications associated with the common keep-alive message.

According to another embodiment, an apparatus comprising at least one processor, and at least one memory including computer program code, the at least one memory and the computer program code configured to, with the at least one processor, cause the apparatus to receive a common keep-alive message, the common keep-alive message representing a plurality of keep-alive messages corresponding respectively to a plurality of applications. The apparatus is further caused to initiate reset of a keep-alive timer corresponding to the plurality of applications based on reception of the common keep-alive message. The keep-alive timer tracks a maximum time interval between data transmissions to maintain one or more data connections for the plurality of applications associated with the common keep-alive message.

According to another embodiment, a computer-readable storage medium carrying one or more sequences of one or more instructions which, when executed by one or more processors, cause an apparatus to receive a common keep-alive message, the common keep-alive message representing a plurality of keep-alive messages corresponding respectively to a plurality of applications. The apparatus is further caused to initiate reset of a keep-alive timer corresponding to the plurality of applications based on reception of the common keep-alive message. The keep-alive timer tracks a maximum time interval between data transmissions to maintain one or more data connections for the plurality of applications associated with the common keep-alive message.

According to yet another embodiment, an apparatus comprises means for receiving a common keep-alive message, the common keep-alive message representing a plurality of keep-alive messages corresponding respectively to a plurality of applications. The apparatus further comprises means for initiating reset of a keep-alive timer corresponding to the plurality of applications based on reception of the common keep-alive message. The keep-alive timer tracks a maximum time interval between data transmissions to maintain one or more data connections for the plurality of applications associated with the common keep-alive message.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

A method and apparatus for optimizing energy consumption for wireless connectivity are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
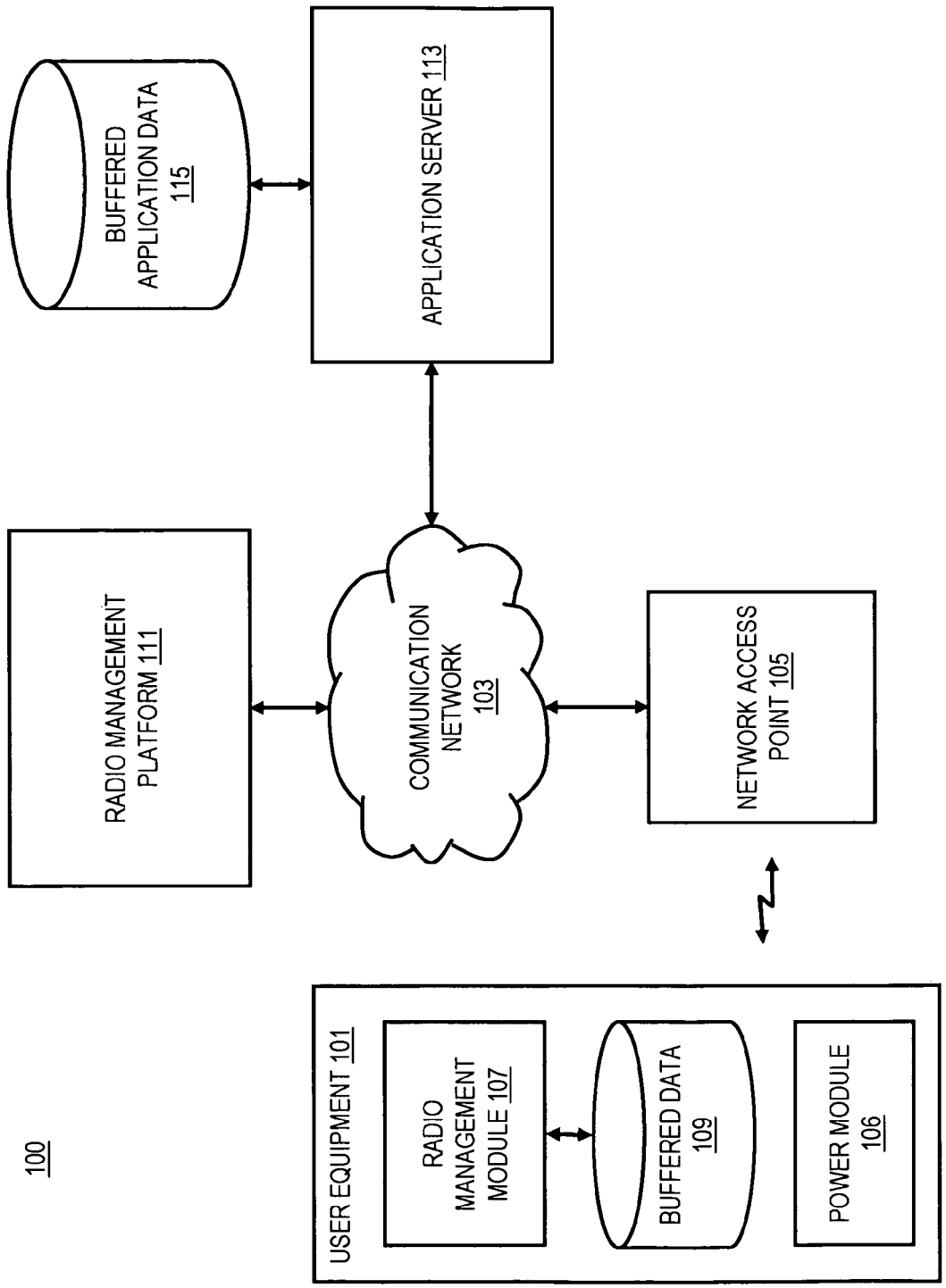
FIG. 1 is a diagram of a communication system capable of optimizing energy consumption for wireless connectivity, according to one embodiment.

FIG. 1 is a diagram of a communication system capable of optimizing energy consumption for wireless connectivity, according to one embodiment. As previously discussed, applications requiring always-on connections (e.g., instant messaging, push E-mail, and social networking) are becoming increasingly popular on wireless mobile devices. However, always-on connections place a considerable drain on the batteries of mobile devices because the radios of the mobile devices typically remain active almost constantly to maintain the always-on connections. For example, always-on connections (e.g., an always-on transmission control protocol (TCP) connection or an always-on user datagram protocol (UDP) connection) require "keep-alive" messages to be periodically transmitted between, for instance, a client and a network application to maintain the corresponding connection. More specifically, most traditional connection protocols (e.g., TCP and UDP) employ stateful firewalls and/or network address translators (NATs) to keep track of active connections, and will drop data packets arriving from outside of the firewall/NAT unless the data packets are part of an existing connection.

The firewall/NAT state with respect to a connection is automatically created when a client inside of the firewall/NAT initiates the connection. The firewall/NAT state is then automatically removed once the connection has been unused for some time. Because the connection state is created by packets sent by the client, servers outside the firewall/NAT are not able to reach the client if the state has expired (e.g., when no data is received for a predefined period of time). To prevent this, many protocols (e.g., TCP and UDP) regularly send keep-alive messages that reset the connection expiration timers in the firewall or NAT to ensure that persistent or always-on connections do not prematurely expire.

Traditionally, the keep-alive messages are dummy data packets that are specific to each application employing an always-on connection. Consequently, as the number of concurrent applications that require always-on connections on a mobile device increases, the number of keep-alive messages that must be sent also increases. By way of example, a user initiates a push E-mail application and an instant messaging application on the user's mobile device. Each application (e.g., the push E-mail application and the instant messaging application), would require separate keep-alive messages to maintain its respective always-on connection. Sending these keep-alive messages can consume significant amounts of energy and place a significant strain on the limited power sources of mobile devices operating off battery power.

To address the general problem of energy consumption when using always-on wireless connections as well as the specific problem of energy consumption when transmitting keep-alive messages over a wireless network, the system 100 of FIG. 1, according to certain embodiments, provides for (1) buffering non-real time data that is to be transmitted, and initiating transmission of the buffered data when the radio of the wireless device is in active state that is triggered by an even unrelated to the buffered non-real time data, e.g., a telephone call, a short message service (SMS) message, or a multimedia messaging service (MMS) message; (2) designating one common keep-alive message to represent multiple keep-alive messages corresponding to different applications; and (3) synchronizing the transmission of data from a client to a corresponding application server and the transmission of data from the application server to client so that they occur concurrently. These functions of the system 100 advantageously reduce the amount of time that the radio of a mobile device remains active, thereby also, reducing the overall energy consumption associated with always-on connections. The system 100 also reduces the complexity associated with signaling multiple keep-alive messages by using one keep-alive message to substitute for or represent multiple keep-alive messages. As used herein, the term "non-real time data" refers to any data that need not be transmitted in real time. The non-real time data may include, for instance, E-mail messages, instant messaging, presence information, shared media content, etc.

As shown in FIG. 1, a system 100 comprises a user equipment (UE) 101 with connectivity to a communication network 103 via a network access point 105. The UE 101 is any type of mobile terminal, fixed terminal, or portable terminal including a mobile handset, station, unit, device, multimedia tablet, Internet node, communicator, desktop computer, laptop computer, Personal Digital Assistant (PDA), or a combination thereof. It is also contemplated that the UE 101 can support any type of interface to the user (such as "wearable" circuitry, etc.). In one embodiment, the UE 101 utilizes a power module 106 for power, which can be in form of a battery or a power adapter configured to plug into, for example, an electrical outlet.

By way of example, the communication network 103 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, mobile ad-hoc network (MANET), and the like.

In one embodiment, the network access point 105 is a base station which is, for instance, part of the wireless network (e.g., Third Generation Partnership Project (3GPP) Long Term Evolution (LTE), 3GPP Evolved Universal Terrestrial Radio Access Network (E-UTRAN), etc.) within the communication network 103. For example, the network access point 105 can employ one or more antennas for transmitting and receiving signals to support communication with the UE 101. The signals support, for instance, communication sessions such as telephone calls, SMS messaging, MMS messaging, transmission of keep-alive messages, or a combination thereof.

As shown in FIG. 1, the UE 101 includes a radio management module 107 to coordinate the optimization of data transmitted over the radio of the UE 101 to reduce energy consumption when using always-on wireless connections. The radio management module 107 has connectivity to a database 109 of data buffered in the UE 101 for subsequent transmission. In one embodiment, the radio management module 107 buffers data that does not require real-time or immediate transmission by the UE 101 (e.g., non-real time data) and stores the data in the database 109. The radio management module 107 can then initiate transmission of the buffered non-real time data when the radio of the UE 101 is in active state triggered by a radio event (e.g., any cellular radio activity) unrelated to the non-real time data (e.g., a telephone call, an SMS message, an MMS message, a keep-alive message, etc.). In one embodiment, the radio event can be any activity by a radio interface (not shown) of the UE 101. In this way, the radio management module 107 reduces the amount of time the radio spends in an active state, thereby reducing energy consumption. As used herein, the term "active state" refers to a state in which the radio interface of the UE 101 is actively transmitting or receiving data or information over the radio network. While in an active state, the UE 101 draws power from the power module 106 to provide for transmitting or receiving data via the radio interface. In contrast, while in an inactive sate, the radio interface of the UE 101 draws less power (e.g., consumes less energy) because the radio interface is not drawing power to transmit or receive. It is also contemplated, that the UE 101 may place the radio interface into a lower power dormant state to further reduce energy consumption when the radio interface is in an inactive state.

The UE 101 also has connectivity to a radio management platform 111 and an application server 113 via the communication network 103. In one embodiment, the radio management platform 111 and the application server 113 interact to reduce energy consumption for wireless transmissions to the UE 101 over always-on connections by buffering non-real time data on the network side; the non-real time data are then sent to the UE 101 when the radio of the UE 101 is otherwise active with a communication task not related to the non-real time data.

More specifically, the radio management platform 111 resides on the network side of the communication network 103 to coordinate the buffering of non-real time data to be transmitted to the UE 101 from, for instance, the application server 113. Although the radio management platform 111 is depicted as a standalone component in the system 100, it is contemplated that the radio management platform 111 may be a component within the application server 113 or other component of the communication network 103.

The application server 113 can be any application that transmits and/or receives data or information from the UE 101. For example, the application server 113 may support push E-mail services to the UE 101 by transporting E-mail data to the UE 101 as they are received. In another example, the application server 113 may support an instant messaging service whereby the application server 113 forwards the instant messages from the UE 101 and delivers instant messages directed to the UE 101. In one embodiment, the application server 113 stores buffered application data in the database 115 for subsequent transmission to the UE 101.

By way of example, the UE 101 communicates with the radio management platform 111, the application server 113, and other components of the communication network 103 using standard protocols (e.g., TCP, UDP). For example, the UE 101, the radio management platform 111, and the application server 113 are network nodes with respect to the communication network 103. In this context, a protocol includes a set of rules defining how the network nodes within the communication network 103 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
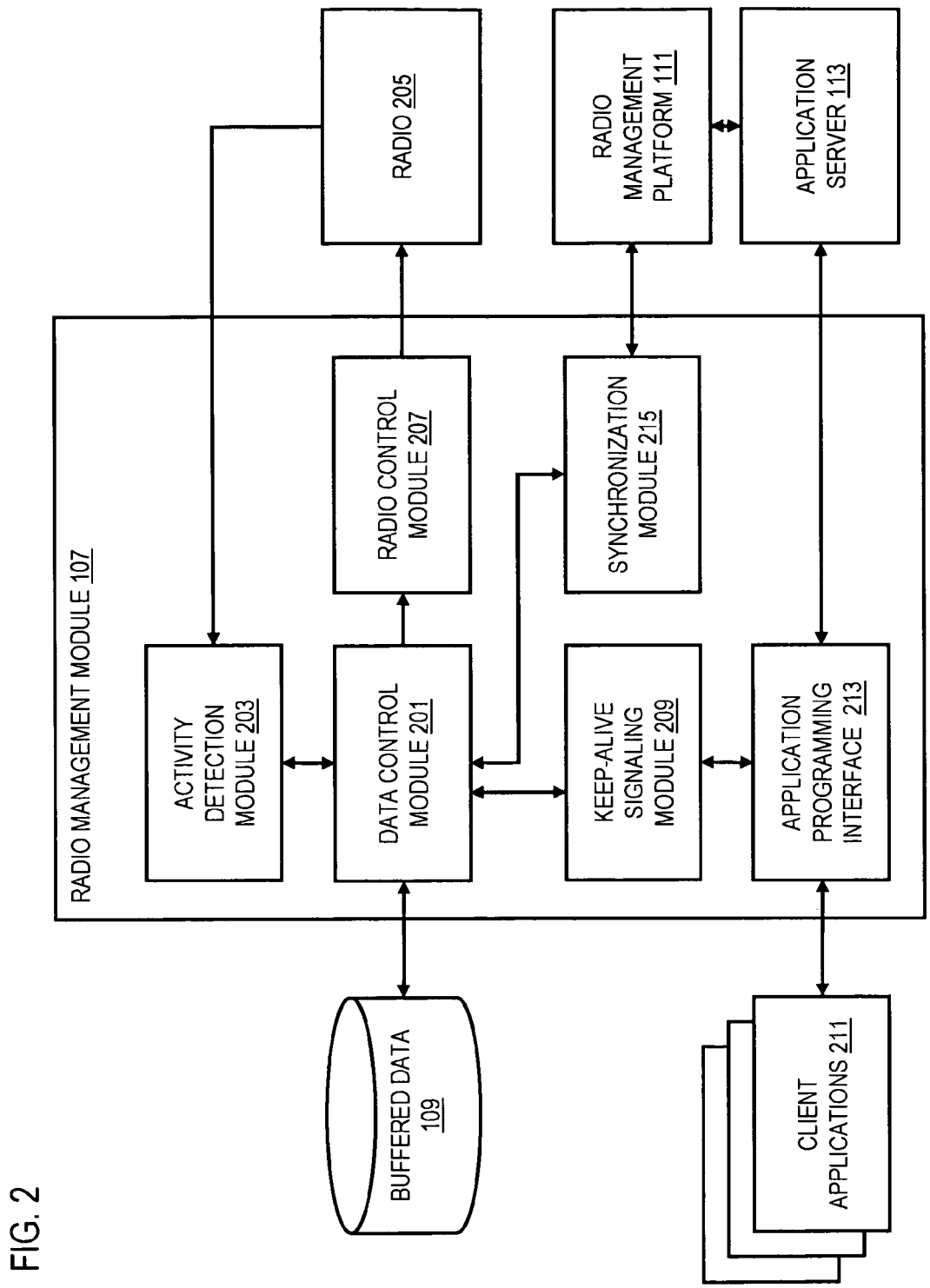
FIG. 2 is a diagram of components of a radio management module, according to one embodiment.

FIG. 2 is a diagram of components of a radio management module, according to one embodiment. By way of example, the radio management module 107 includes one or more components for optimizing energy consumption for wireless connectivity in the UE 101. It is contemplated that the functions of these components may be combined in one or more components or performed by other components of equivalent functionality. In this embodiment, the radio management module 107 includes a data control module 201 for coordinating the buffering of non-real time data that is to be transmitted by the UE 101. By way of example, the buffered data comprises data that need not be transmitted real time (e.g., push E-mail, instant messaging data, etc.). The data control module 201, for instance, initiates storage the non-real time data in the database 109. In certain embodiments, the data control module 201 may store the non-real time data for transmission according to one or more priority classifications applied to the buffered data. For example, the buffered data with a higher priority classification may be moved ahead of lower priority buffered data so that the higher priority data will be transmitted first. Example priority classifications include "best effort" whereby the data control module 201 will use the best available mechanism for transmitting the data or "non reliable" whereby the potential for dropped or lost data packets is acceptable. In addition, the priority classification may also specify a time window in which the buffered data or a portion of the buffered data (e.g., non-real time data) is to be transmitted. For example, if the data control module 201 cannot initiate transmission of the buffered data within the time window of the associated priority classification, the data control module 201 can remove that from the buffered data database 109 for transmission by a non-buffered mechanism (e.g., direct real-time transmission).

As shown, the data control module 201 has connectivity to an activity detection module 203 for detecting when the radio 205 of the UE 101 is in an active state. In one embodiment, the radio 205 is a cellular radio for communicating over the wireless network of the communication network 103. The active state, for instance, may be triggered by a radio event unrelated to the buffered data (e.g., a telephone call, an SMS message, an MMS message, a keep-alive message, and the like). For example, the activity detection module 203 can either monitor the radio 205 for activity or the radio 205 can signal the activity detection module 203 when there is activity. On detecting activity by the radio 205, the data control module 201 directs the radio control module 207 to initiate transmission of the buffered data in the database 109. In this way, the radio management module 107 can take advantage of periods when the radio is already active performing other tasks to transmit the buffered data, thereby reducing the need to activate the radio at other times and reducing energy consumption. In one embodiment, the data control module 201 can initiate a complete "flushing" (e.g., transmitting and then emptying) of all data buffered since the last transmission. In addition or alternatively, the data control module 201 can initiate the transmission of the buffered data in discrete bursts that coincide with the duration of the active period of the radio 205.

The data control module 201 also has connectivity to a keep-alive signaling module 209 for designating one common keep-alive message to represent multiple keep-alive messages from a plurality of applications. In other words, the common keep-alive message substitutes for the individual keep-alive messages corresponding to each application associated with the common keep-alive message. Creating one keep-alive message for multiple applications advantageously reduces the signaling requirements for transmitting and maintaining multiple keep-alive messages, thereby also reducing energy consumption required for transmitting the keep-alive messages. In one embodiment, the common keep-alive message can reset the connection expiration timer (e.g., keep-alive timer) corresponding to the always-on connections of the applications associated with the common keep-alive message. In addition, transmission of data from any one of the associated applications can also reset the connection expiration timer for all of the applications associated with the same common keep-alive message.

The associated applications (e.g., client applications 211 on the UE 101 and the application server 113 on the communication network 103) can access the functions of the keep-alive signaling module 209 through, for instance, an application programming interface (API) 213 within the radio management module 107. By way of example, the API 213 provides a set of routines, data structures, objects classes, and/or protocols for applications (e.g., client applications 211 and the application server 113) to access the functions of the keep-alive signaling module 209 in particular and the radio management module 107 in general. Client applications 211 comprise, for instance, applications that are run on the UE 101 to establish connections (e.g., always on connections) for transmitting and/or receiving data or information from external applications such as the application server 113.

As shown in FIG. 2, the data control module 201 also has connectivity to a synchronization module 215 for synchronizing the exchange of data or information between the UE 101 and, for instance, the application server 113. For example, synchronization includes coordinating the timing of the transmission of data from the UE 101 to the application server 113 to occur concurrently with the transmission of data from the application server 113 to the UE 101. To assist in synchronizing, the synchronization module 215 interacts with the radio management platform 111 to coordinate the transmission of data and information with the application server 113. In one embodiment, the synchronization module 215 may dynamically detect radio activity to synchronize the transmissions or may negotiate a predefined schedule with the application server 113 for synchronized transmissions. The schedule may, for instance, specify specific times that the UE 101 and the application server 113 should make their respective transmissions. In this way, the active period of the radio 205 is used for both transmitting and receiving information, thereby minimizing the amount of the time the radio 205 is active and reducing energy consumption. As described with respect to the data control module 201 earlier, it is contemplated that the synchronized transmissions may occur as discrete bursts or a complete flushing of the buffered data.

Figure 3:
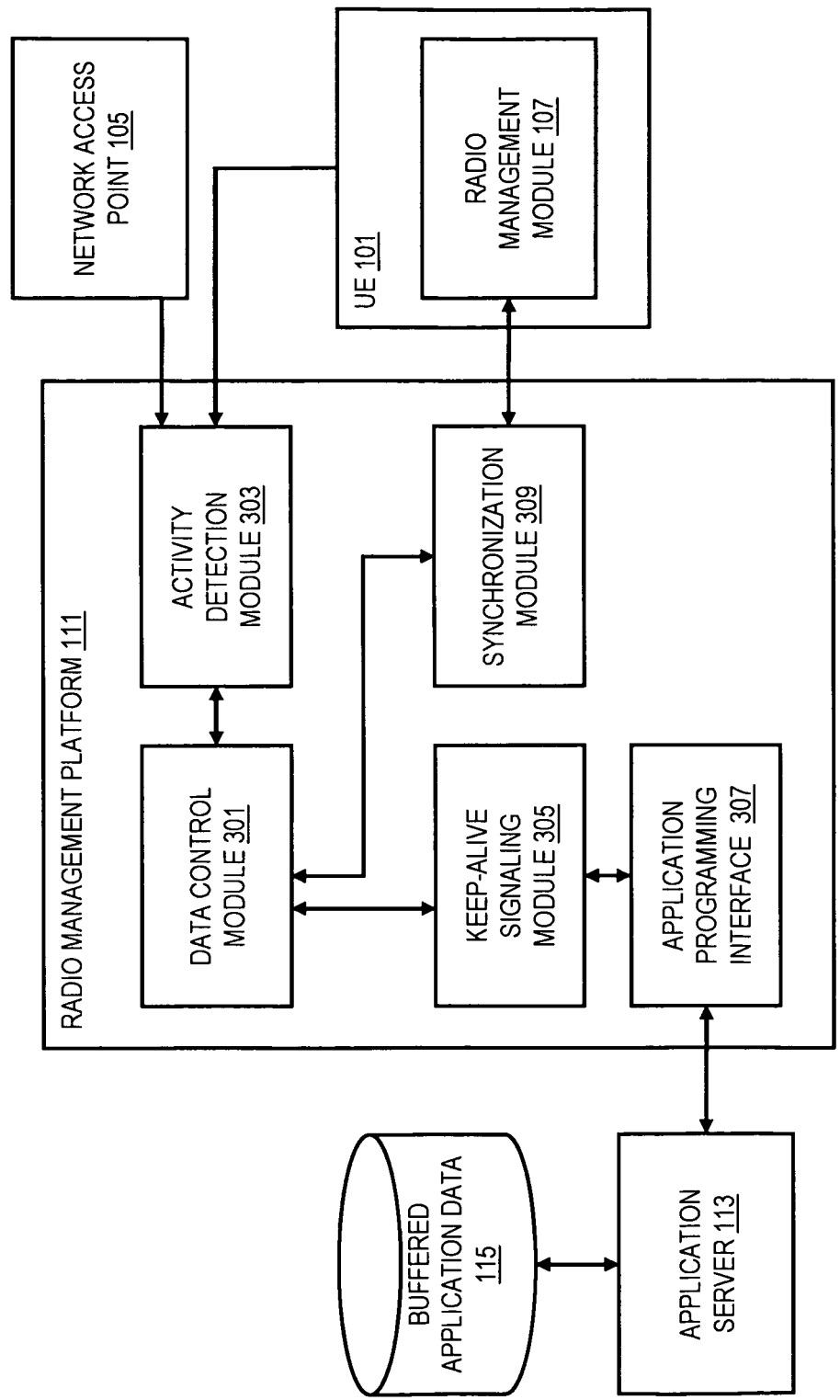
FIG. 3 is a diagram of components of a radio management platform, according to one embodiment.

FIG. 3 is a diagram of components of a radio management platform, according to one embodiment. By way of example, the radio management platform 111 performs functions that are similar to those performed by the radio management module 107 but on the communication network 103 side. The radio management platform 111, therefore, includes one or more components for optimizing energy consumption for wireless connectivity with the UE 101 that are similar to the components described with respect to the radio management module 107. It is contemplated that the functions of these components may be combined in one or more components or performed by other components of equivalent functionality. In exemplary embodiments, the radio management platform 111 includes a data control module 301 for coordinating the buffering of data that is to be transmitted to the UE 101 from, for instance, the application server 113. In one embodiment, non-real time data is stored in the buffered application data database 115 before transmission to the UE 101. The data, in this case, is generated by or associated with the application server 113 that, for instance, supports various applications (e.g., push E-mail, instant messaging, etc.) using always-on connections. As described with respect to the radio management module 107, the buffered data typically is data that need not be transmitted to the UE 101 in real time. If real-time transmission is needed, the application server 113 can use another data transmission mechanism that can deliver the data according to the requirements of the application server 113.

A shown, the data control module 301 has connectivity to an activity detection module 303 for detecting when the application server 113 receives data from the UE 101 or when there is network traffic to or from the UE 101 at the network access point 105 (e.g., when the UE 101 is engaged in transmitting or receiving a telephone call, an SMS message, an MMS message, an instant message, a keep-alive message, etc.). Detection of either the reception of data by the application server 113 or network traffic related to the UE 101 at the network access point 105 indicates, for instance, that the radio 205 of the UE 101 is active. On such detection, the data control module 301 directs the application server 113 via an application programming interface (API) 307 to initiate transmission of the buffered application data from the database 115. As described with respect to the radio management module 107, the transmission may occur as a complete flush or as discrete bursts. Because the transmission coincides with an existing active state of the radio 205, energy consumption at the UE 101 is minimized when the UE receives the transmission from the application server 113.

The data control module 301 also has connectivity to a keep-alive signaling module 305 for receiving and processing a common keep-alive message from the UE 101. In one embodiment, the common keep-alive message is applicable to all applications associated with the common keep-alive message. For example, an application (e.g., on application server 113) may associate itself with the common keep-alive message (e.g., combine the application's individual keep-alive message with the common keep-alive message) via the API 307. Once associated, the reception of the common keep-alive message by the keep-alive signaling module 305 will reset the connection expiration timer (e.g., keep-alive timer) corresponding to the associated applications. In certain embodiments, the reception of any data from any of the applications associated with the common keep-alive message will reset the connection expiration timer for all applications associated with the common keep-alive message. By way of example, if a push E-mail application and an instant messaging application are associated with one common keep-alive message, reception of the common keep-alive message will reset the connection expiration timer for both the push E-mail and instant messaging applications. Additionally, reception of data associated with either application will also reset the connection expiration timer for both the push E-mail and the instant messaging applications. In this way, the UE 101 need only send one common keep-alive message rather than multiple messages to maintain an always-on connection, thereby reducing activity of the radio 205 and reducing energy consumption.

As shown in FIG. 3, the data control module 301 also has connectivity to a synchronization module 309 for synchronizing the exchange of data or information between the application server 113 and the UE 101. As described with respect to the radio management module 107, synchronization includes coordinating the timing of the transmission of data from the network side (e.g., application server 113) to occur concurrently with the transmission of data from the client side (e.g., the UE 101). To assist in synchronizing, the synchronization module 309 interacts with the radio management module 107 of the UE 101 to coordinate the exchange of data. By way of example, the exchange of data between the application server 113 and the UE 101 may occur based on dynamic detection of when the radio 205 of the UE 101 is active or according to a predefined schedule negotiated between the application server 113 and the UE 101. Coordination of the transmission from network side with transmissions from the client side enables the UE 101 to minimize energy consumption by fully utilizing both the transmitting and receiving channels of the radio 205 of the UE 101.

Figure 4:
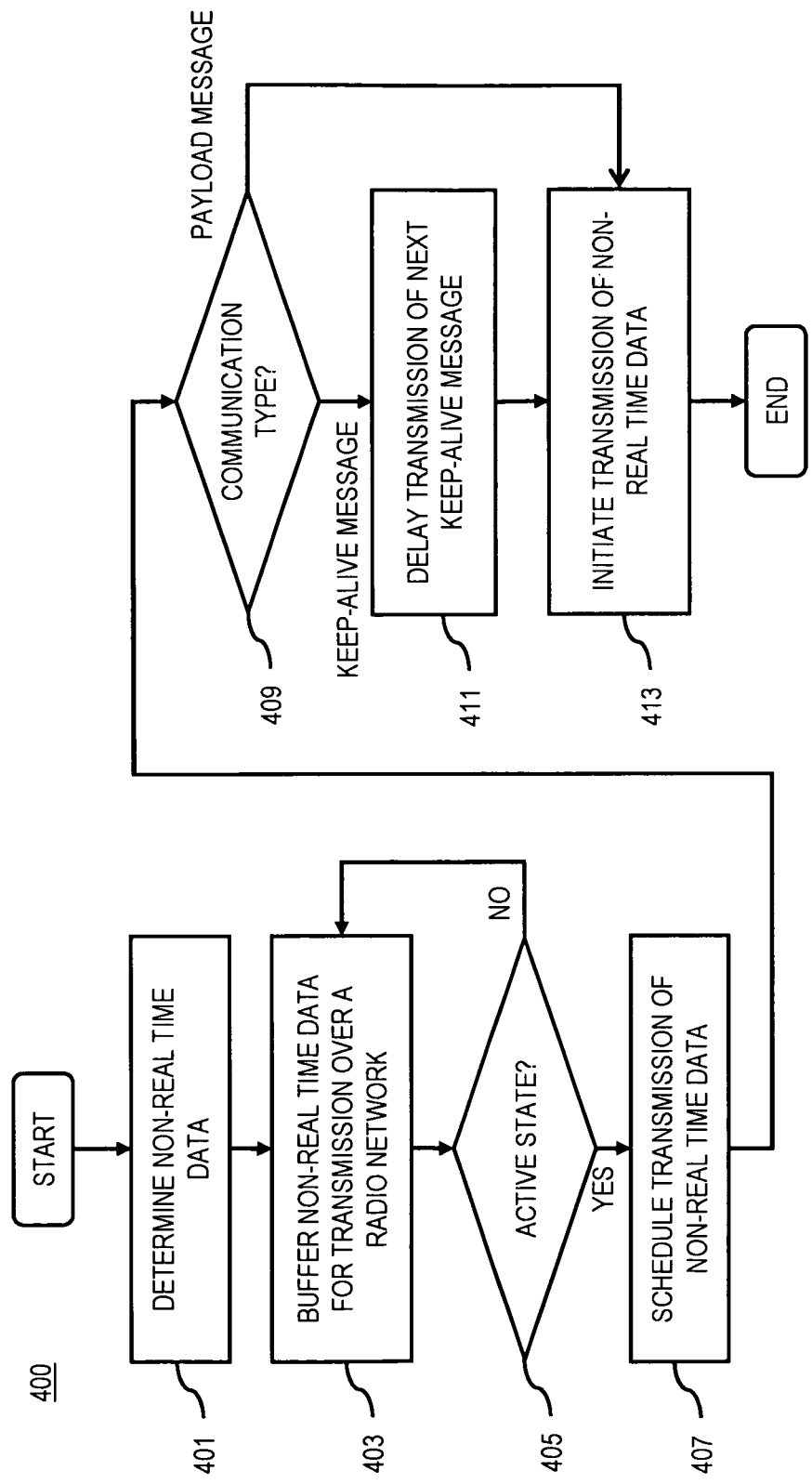
FIG. 4 is a flowchart of a process for optimizing energy consumption by buffering data on a wireless device, according to one embodiment.
Figure 11:
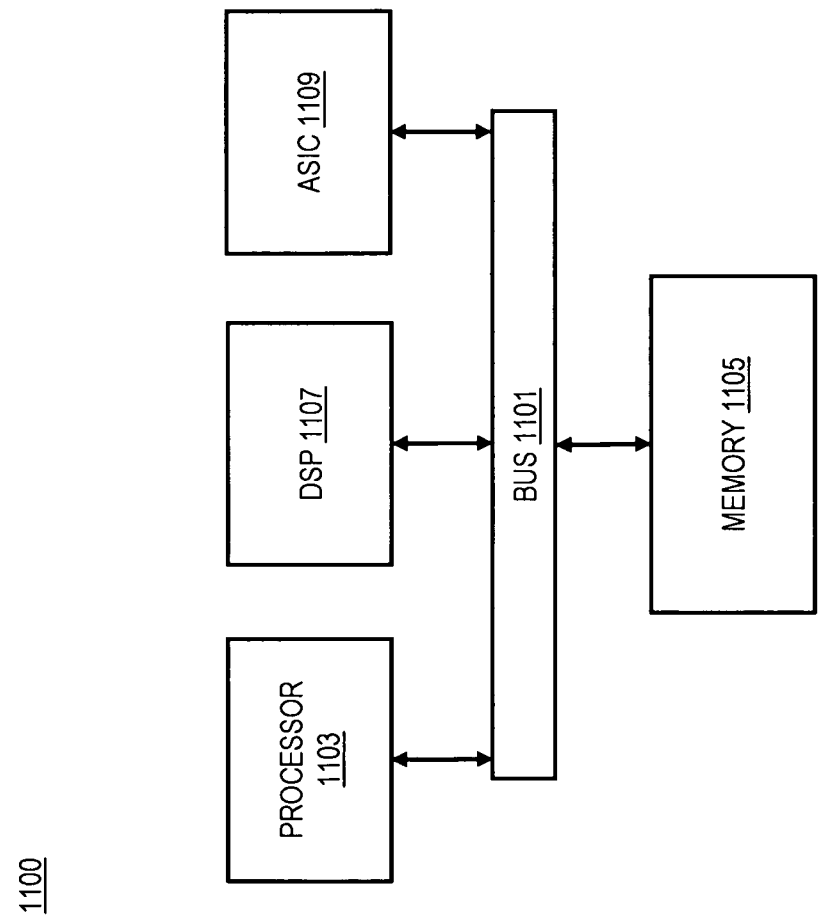
FIG. 11 is a diagram of a chip set that can be used to implement an embodiment of the invention.

FIG. 4 is a flowchart of a process for optimizing energy consumption by buffering data on a wireless device, according to one embodiment. In one embodiment, the radio management module 107 performs the process 400 and is implemented in, for instance, a chip set including a processor and a memory as shown in FIG. 11. In step 401, the radio management module 107 determines whether data that is to be transmitted by the UE 101 is non-real time data suitable for transmission using the process as described herein. For example, as opposed to real-time data (e.g., voice), non-real time data need not be transmitted continuously in real-time. Instead, non-real time data is tolerant of potential delays and gaps in transmission introduced by the approach of system 100. For instance, non-real time data include E-mail, presence information, and the like. After determining that the data to be transmitted by the UE 101 is non-real time data that is suitable for transmission using system 100, the radio management module 107 buffers the non-real time data for transmission over the communication network 103 (step 403). For example, instead of immediately transmitting non-real time data, the radio management module 107 stores and buffers the data for subsequent transmission when the UE 101 is in an active state. In addition, it is contemplated that the UE 101 can bypass the use of buffered data transmissions when power is not a limiting factor (e.g., when the UE 101 is connected to a constant power source). After buffering the data, the radio management module 107, for instance, monitors the radio of the UE 101 to determine when it is in an active state (step 405). By way of example, this active state is triggered by a radio event unrelated to the non-real time data (e.g., actively transmitting or receiving a telephone call, an SMS message, an MMS message, etc.). It is contemplated that the active state may be triggered by transmission of any real-time message that is, for instance, unrelated to the buffered non-real time data. If the radio is not in an active state, the radio management module 107 continues to buffer the data for subsequent transmission.

If the radio is, for instance, in an active state, the radio management module 107 schedules the transmission of the buffered data over the communication network 103 (step 407). In one embodiment, the transmission is scheduled to occur during the detected active state or when the radio is otherwise active if possible. For example, when the radio management module 107 detects that the UE 101 is receiving a telephone call, the module 107schedules transmission of the buffered data to occur while the radio is active on the telephone call. If, however, the radio is not anticipated to be active within a predetermined time period, the radio management module 107 may schedule the transmission for a time when the radio is not already in an active state. After scheduling the transmission, the radio management module 107 determines a communication type for carrying or transmitting the non-real time date. In one embodiment, the communication type for carrying the data is either a keep-alive message (as described previously) or a payload message. As used herein, a "payload message" is a message transmitted over the communication network 103 that carries data from, for instance, the application server 113, client applications 211, or other network component (step 409).

By way of example, if the communication type is a keep-alive message, the radio management module 107 inserts the non-real time data into the keep-alive message in place of dummy data that is normally part of the keep-alive message. In this way, actual data rather than dummy data may be used to construct the keep-alive message. Because the keep-alive message carrying the non-real time data serves the dual purpose of both conveying data and maintaining data connections, the radio management module 107 can delay the transmission of a keep-alive message that is scheduled for a subsequent time period (e.g., the next keep-alive message) (step 411). It is noted that the next keep-alive generally would not be needed because the keep-alive message carrying the non-real time data can substitute for the next keep-alive message. The radio management module 107 then initiates transmission of the non-real time data based on the determined communication type (e.g., via either the keep-alive message or the payload message) (step 413). In addition, if the determined communication type is a payload message, the radio management module 107 can initiate transmission of the payload message without performing the process at 411 (step 413).

This transmission scheme reduces the number of periods in which the radio is active to reduce energy consumption. In one embodiment, the buffered non-real-time data may be associated with one or more priority classifications. These priority classifications, direct the transmission priorities of individual portions of the buffered data. For example, buffered non-real time data with the highest priority classification will be transmitted first, followed by progressively lower classifications. In certain embodiments, the priority classification may also specify a particular time window in which the buffered data must be transmitted.

Figure 5:
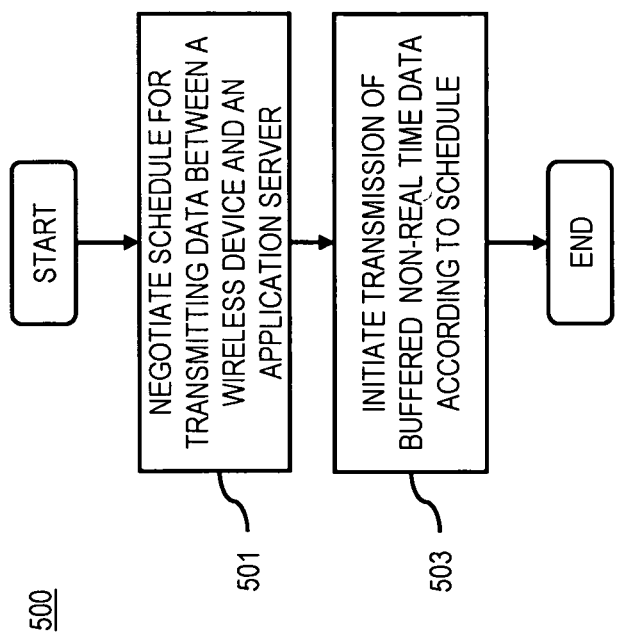
FIG. 5 is a flowchart of a process for optimizing energy consumption by synchronizing the transmission of buffered data on a wireless device, according to one embodiment.

FIG. 5 is a flowchart of a process for optimizing energy consumption by synchronizing the transmission of buffered data on a wireless device, according to one embodiment. In one embodiment, the radio management module 107 performs the process 500 and is implemented in, for instance, a chip set including a processor and a memory as shown in FIG. 11. In step 501, the radio management module 107 negotiates a schedule for the transmission of the buffered non-real time data from the UE 101 to an application server 113 so that information can be transmitted and received between the UE 101 and the application server 113 at the same time. In other words, the radio management module 107 synchronizes the timing of the transmission of data from the UE 101 to occur concurrently with the reception of data that is transmitted from the application server 113. In one embodiment, the schedule negotiation and synchronization are performed using an application programming interface (e.g., API 213 or API 307) to align the timing of transmissions of the UE 101 and the application server 113. The timing of the synchronized transmissions can be, for instance, based on dynamically detecting when the radio of the UE 101 is active or based on a negotiated schedule. If the transmissions are based on a negotiated schedule, the radio management module 107 consults the schedule to determine the specific times to initiate the transmissions of the buffered data. The radio management module 107 then initiates transmission of the buffered data according to the synchronized schedule so that the transmission from the UE 101 occurs concurrently with the transmission of data from the application server 113 (step 503).

Figure 6:
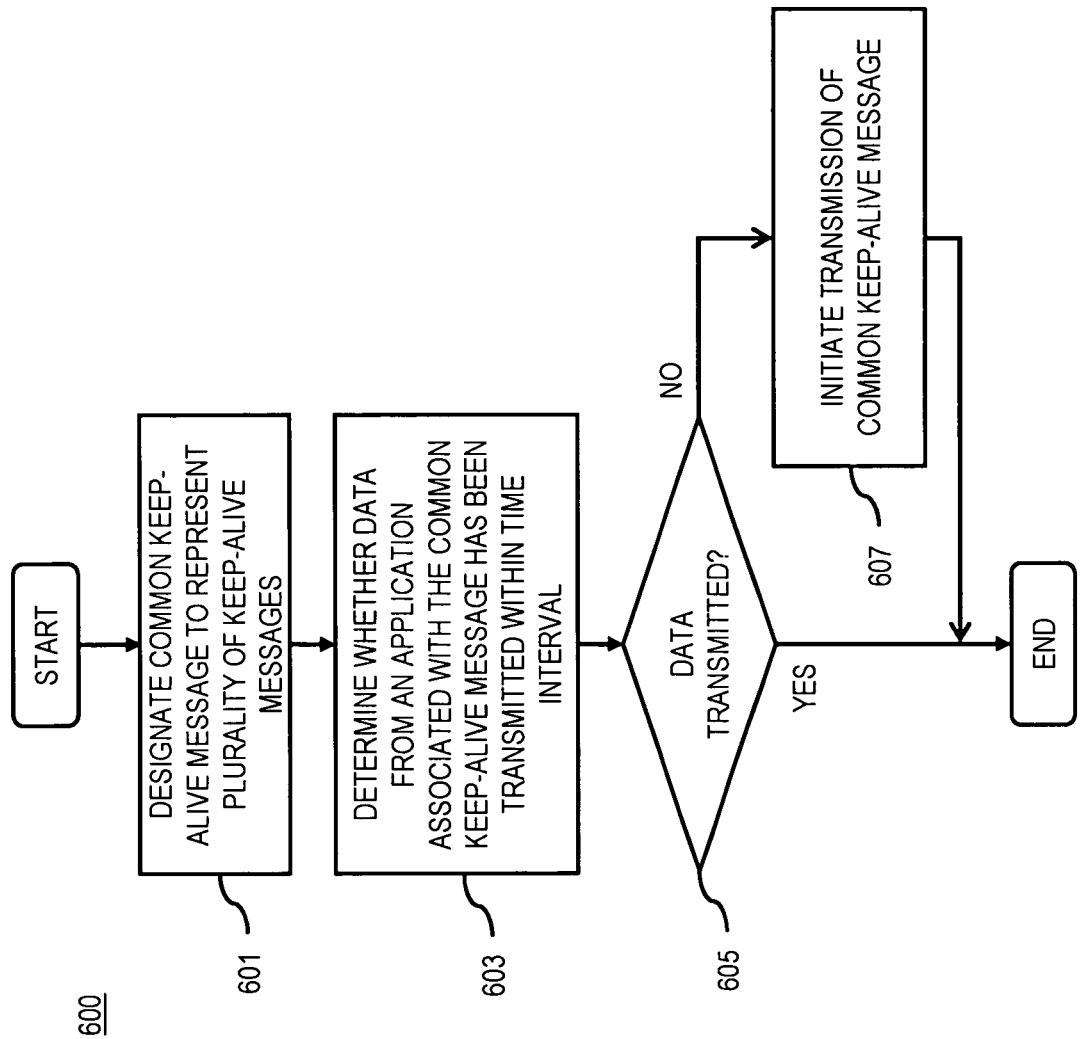
FIG. 6 is a flowchart of a process for optimizing energy consumption by designating a common keep-alive message, according to one embodiment.

FIG. 6 is a flowchart of a process for optimizing energy consumption by designating a common keep-alive message, according to one embodiment. In one embodiment, the radio management module 107 performs the process 600 and is implemented in, for instance, a chip set including a processor and a memory as shown in FIG. 11. In step 601, the radio management module 107 designates a common keep-alive message to represent a plurality of keep-alive messages. The plurality of keep-alive messages, for instance, corresponds respectively to a plurality of applications requiring always-on connections. As discussed previously, traditional communication protocols (e.g., TCP and UDP) close connections if those connections are not used for a period of time. To keep the connections open (e.g., when using always-on connections), the client initiating the connection typically sends a keep-alive message when there is a period of inactivity. The connection, however, will be kept open if there is any activity between the client and the corresponding application. When using the common keep-alive message, network activity from any application associated with the keep-alive message is sufficient to keep network connections open for all applications associated with the common keep-alive message. Accordingly, the radio management module 107 determines whether data from an application associated with the common keep-alive message has been transmitted within the maximum time interval for maintaining the respective data connections (steps 603 and 605). If no data has been transmitted within the time interval, the radio management module 107 initiates transmission of the common keep-alive message to, for instance, the application server 113 (step 607). In one embodiment, the reception of the keep-alive message by the application server 113 is sufficient to keep the connections open for all applications associated with the common keep-alive message. As described previously, an application may associate itself with the common keep-alive message via the API 213 (or the API 307 if on the server side).

Figure 7:
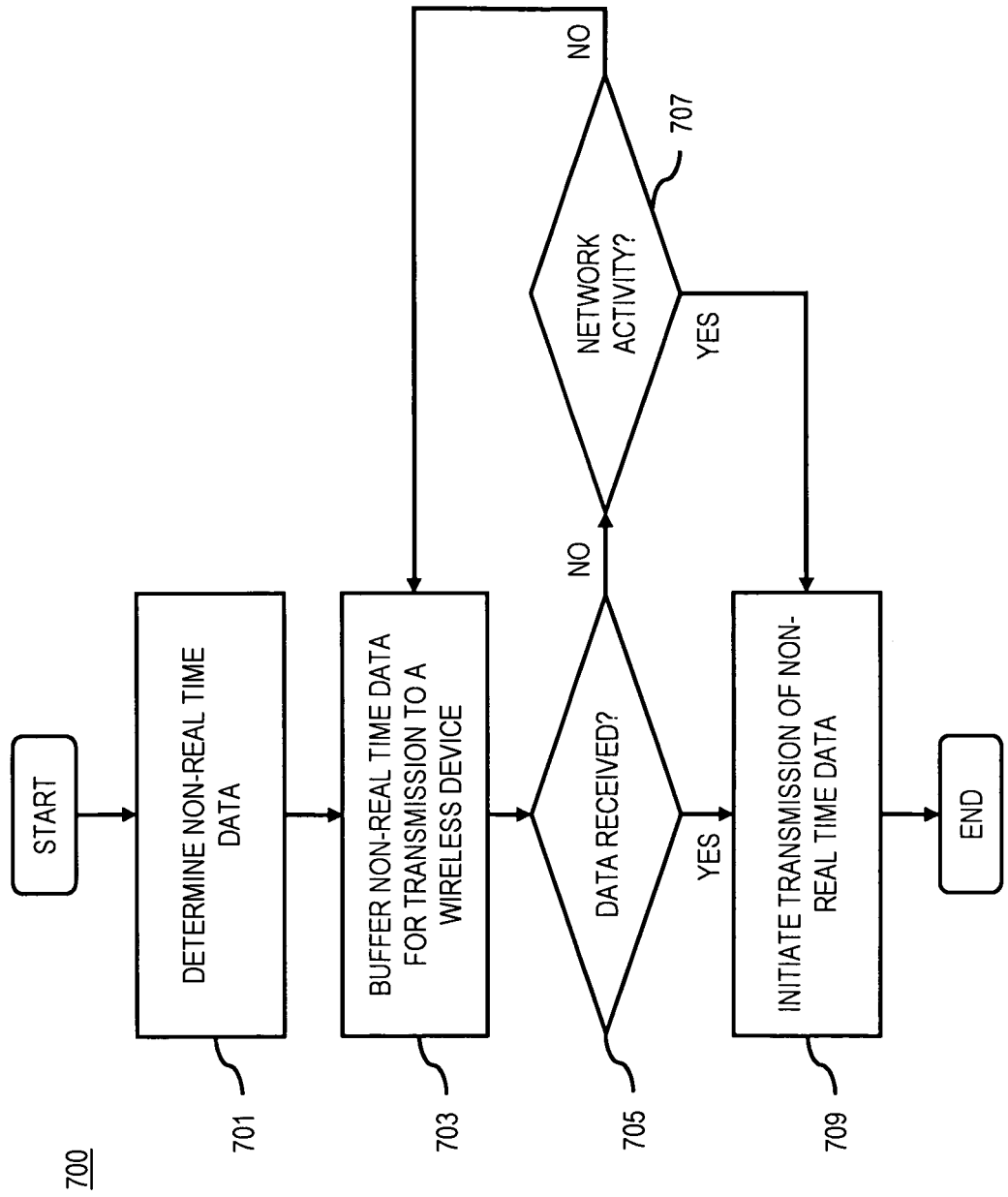
FIG. 7 is a flowchart of a process for optimizing energy consumption by buffering data on an application server, according to one embodiment.

FIG. 7 is a flowchart of a process for optimizing energy consumption by buffering data on an application server, according to one embodiment. In one embodiment, the radio management platform 111 performs the process 700 and is implemented in, for instance, a chip set including a processor and a memory as shown in FIG. 11. The process 700 is analogous to the process 400 of FIG. 4, but is performed on the server or network side. In step 701, the radio management platform 111 determines that the application server 113 is to transmit non-real time data to the UE 101 using the process as described with respect to the FIG. 4. The data, for instance, is data generated by the application server 113 that need not be transmitted in real time. After this determination, the radio management platform 111 buffers the non-real time data for transmission to a wireless device over the communication network 103 (step 703). The buffering of the data minimizes the periods in which the radio of the UE 101 has to be in an active state to receive data from the application server 113, thereby reducing energy consumption by the UE 101. In addition, the buffered data may be assigned a priority classification to determine priority order for transmitting the buffered data as described with respect to FIG. 4.

In one embodiment, the transmission of the buffered data is triggered by the receipt of data from the UE 101 or when there is network traffic involving the UE 101. In step 703, the radio management platform 111 determines whether the application server 113 has received data from the UE 101 (step 705). Reception of data from the UE 101 is indicative of the radio of the UE 101 being in an active state. If no data is received, the radio management platform 111 determines whether there is any network activity to or from the UE 101 at the network access point 105 (step 707). Activity at the network access point 105 indicates that the radio of the UE 101 may be actively transmitting or receiving (e.g., when on a telephone call, SMS message session, MMS message session, etc.). For example, the radio management platform 111 can either poll the network access point 105 for the activity or the network access point 105 can report the activity to the radio management platform 111. It is contemplated that the network activity is unrelated to the buffered non-real time data. In addition, the network activity need not be directed from the UE 101 to the application server 113 because the process 700 can depend on any active state of the radio 205 of the UE 101. If no network activity is detected at the network access point 105, the radio management platform 111 continues to buffer the transmission data. If data is received or network activity is detected, the radio management platform 111 initiates transmission of the buffered application data to the UE 101 (step 709).

Figure 8:
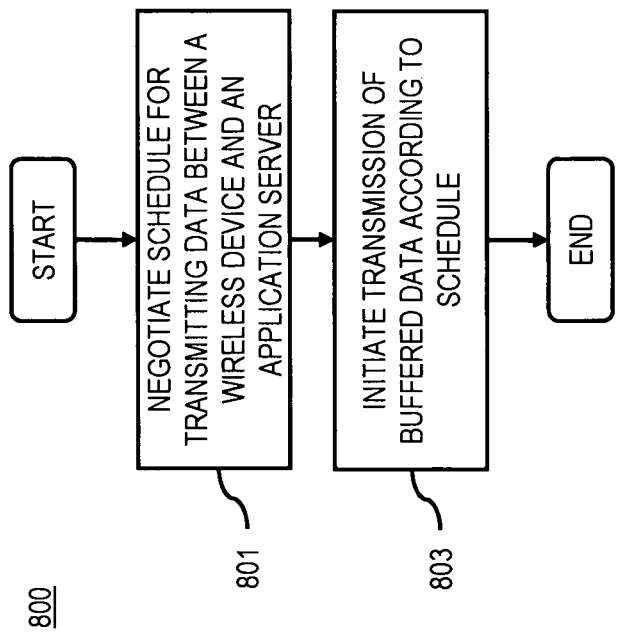
FIG. 8 is a flowchart of a process for optimizing energy consumption by synchronizing the transmission of buffered data on an application server, according to one embodiment.

FIG. 8 is a flowchart of a process for optimizing energy consumption by synchronizing the transmission of buffered data on an application server, according to one embodiment. In one embodiment, the radio management platform 111 performs the process 800 and is implemented in, for instance, a chip set including a processor and a memory as shown in FIG. 11. The process 800 is analogous to the process 500 of FIG. 5, but is performed on the server or network side. In step 801, the radio management platform 111 negotiates a schedule for the transmission of buffered application data from the application server 113 to the UE 101 to occur concurrently with the reception of data from the UE 101. As described previously, the schedule negotiation and synchronization is performed using an application programming interface (e.g., API 213 or API 307) to align the timing of transmissions of the UE 101 and the application server 113. The timing of the synchronized transmissions can be, for instance, based on dynamically detecting when the radio of the UE 101 is active or based on a negotiated schedule. If the transmissions are based on a negotiated schedule, the radio management platform 111 consults the schedule to determine the specific times to initiate the transmissions of the buffered data to the UE 101. The radio management platform 111 then initiates transmission of the buffered application data according to the synchronized schedule so that the transmission to the UE 101 occurs concurrently with the transmission of data from the UE 101 (step 803).

Figure 9:
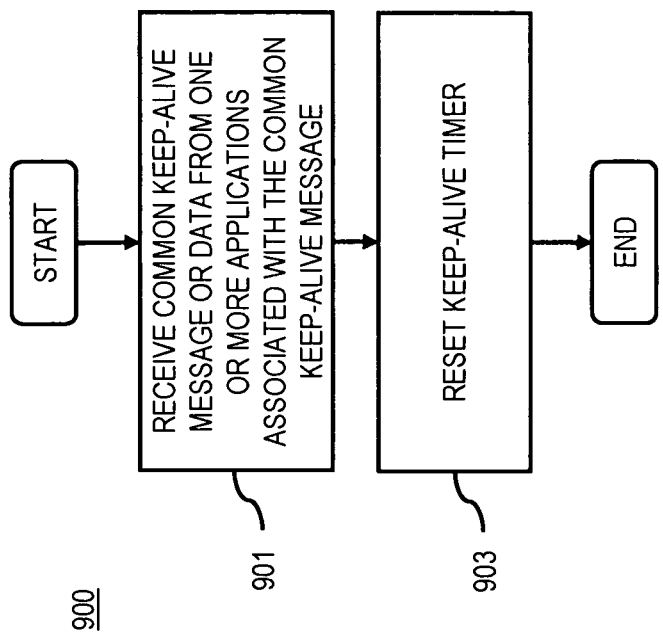
FIG. 9 is a flowchart of a process for optimizing energy consumption by receiving a common keep-alive message on an application server, according to one embodiment.

FIG. 9 is a flowchart of a process for optimizing energy consumption by receiving a common keep-alive message on an application server, according to one embodiment. In one embodiment, the radio management platform 111 performs the process 900 and is implemented in, for instance, a chip set including a processor and a memory as shown in FIG. 11. The process 900 is the server- or network-side counterpart to the process 600 of FIG. 6. In step 901, the radio management platform 111 receives a common keep-alive message or data from one or more applications associated with the common keep-alive message. By way of example, the common keep-alive message represents the individual keep-alive messages of a plurality of applications. For example, the common keep-alive message substitutes for the individual keep-alive message associated with each of the plurality of applications. On reception of either the common keep-alive message or data from any of the applications associated with the common keep-alive package, the radio management platform 111 initiates the resetting of a keep-alive timer corresponding to each of the plurality of applications associated with the common keep-alive message (step 903). The keep-alive timer or connection expiration timer tracks a maximum time interval between data transmissions to maintain a connection and keep the connection from expiring. In other words, the reception of the common keep-alive message or data from any of the applications associated with the common keep-alive message is sufficient to keep the connections corresponding to all of the plurality of applications open.

The processes described herein for optimizing energy consumption for wireless connectivity may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
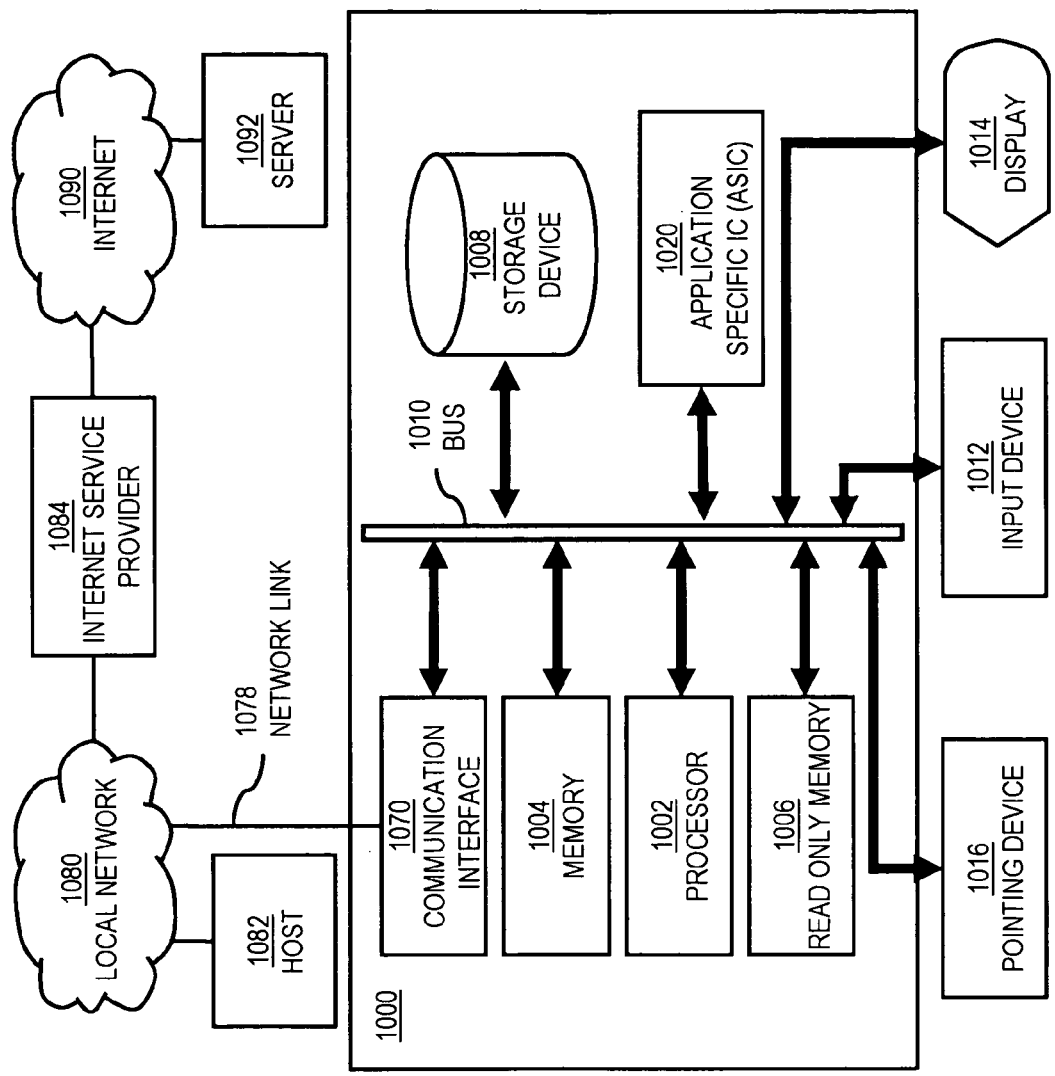
FIG. 10 is a diagram of hardware that can be used to implement an embodiment of the invention.

FIG. 10 illustrates a computer system 1000 upon which an embodiment of the invention may be implemented. Computer system 1000 is programmed (e.g., via computer program code or instructions) to optimize energy consumption for wireless connectivity as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to optimize energy consumption for wireless connectivity. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for optimizing energy consumption for wireless connectivity. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for optimizing energy consumption for wireless connectivity, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 103 for optimizing energy consumption for wireless connectivity.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090. A computer called a server host 1092 connected to the Internet hosts a process that provides a service in response to information received over the Internet. For example, server host 1092 hosts a process that provides information representing video data for presentation at display 1014.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set 1100 upon which an embodiment of the invention may be implemented. Chip set 1100 is programmed to optimize energy consumption for wireless connectivity as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to optimize energy consumption for wireless connectivity. The memory 1105 also stores the data associated with or generated by the execution of the inventive steps.

Figure 12:
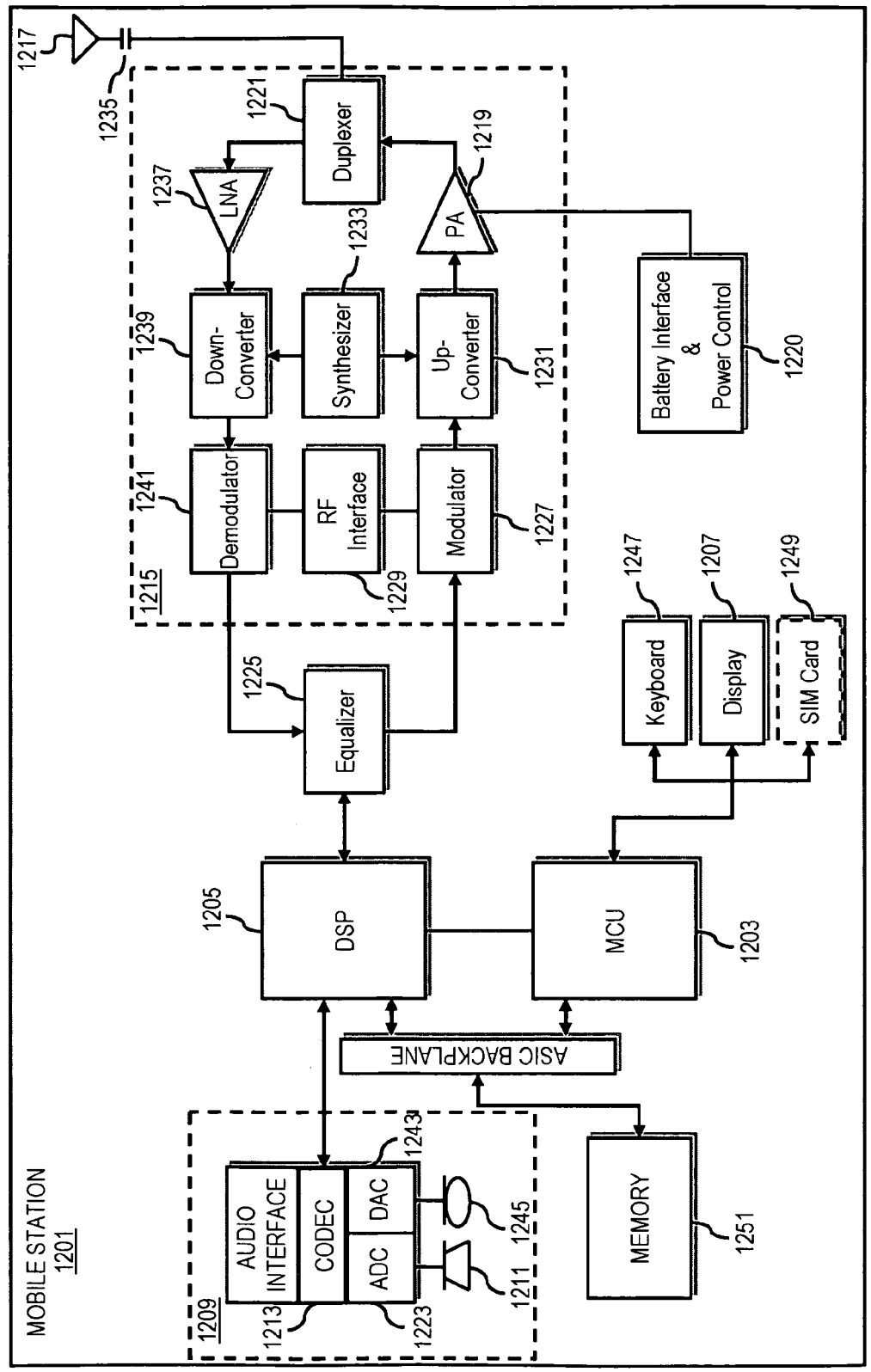
FIG. 12 is a diagram of a mobile station (e.g., handset) that can be used to implement an embodiment of the invention.

FIG. 12 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application, the term "circuitry" would also cover an implementation of merely a processor (or multiple processors) and its (or their) accompanying software/or firmware. The term "circuitry" would also cover, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to optimize energy consumption for wireless connectivity. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   buffering non-real time data for transmission over a radio network;
   scheduling transmission of the non-real time data by a wireless device;
   determining a communication type, comprising a keep-alive message and a payload message, for carrying the non-real time data; and
   initiating transmission of the non-real time data based on the scheduling and the determined communication type; and
   when the communication type is a keep-alive message, designating a common keep-alive message to represent a plurality of keep-alive messages corresponding respectively to a plurality of applications.

2. A method of claim 1, wherein the determined communication type is a keep-alive message, and the method further comprising:
  delaying transmission of a next keep-alive message after making the determination to carry the non-real time data in the keep-alive message.

3. A method of claim 1, wherein the transmission of the non-real time data is scheduled according to an active state of a radio used by the wireless device to communicate over the radio network, and wherein the active state is triggered by transmission of a real-time message unrelated to the non-real time data.

4. A method of claim 1, further comprising:
  determining whether data corresponding to one or more of the plurality of applications associated with the common keep-alive message has been transmitted within a maximum time interval for transmitting the common keep-alive message; and
  initiating transmission of the common keep-alive message if no data has been transmitted within the maximum time interval.

5. A method of claim 1, further comprising:
  initiating transmission of the non-real time data to an application server to occur concurrently with reception of application data from the application server.

6. An apparatus comprising:
  at least one processor; and
  at least one memory including computer program code,
  the at least one memory and the computer program code configured to, with the at least one processor, cause the apparatus to perform at least the following,
    buffer non-real time data for transmission over a radio network,
    schedule transmission of the non-real time data by a wireless device,
    determine a communication type, comprising a keep-alive message and a payload message, for carrying the non-real time data, and
    initiate transmission of the non-real time data based on the scheduling and the determined communication type; and
    when the communication type is a keep-alive message, designating a common keep-alive message to represent a plurality of keep-alive messages corresponding respectively to a plurality of applications.

7. An apparatus of claim 6, wherein the determined communication type is a keep-alive message, and the apparatus is further caused to:
  delay transmission of a next keep-alive message after making a determination to carry the non-real time data in the keep-alive message.

8. An apparatus of claim 6, wherein the transmission of the non-real time data is scheduled according to an active state of a radio used by the wireless device to communicate over the radio network, and wherein the active state is triggered by transmission of a real-time message unrelated to the non-real time data.

9. An apparatus of claim 6, wherein the apparatus is further caused to:
  determine whether data corresponding to one or more of the plurality of applications associated with the common keep-alive message has been transmitted within a maximum time interval for transmitting the common keep-alive message; and
  initiate transmission of the common keep-alive message if no data has been transmitted within the maximum time interval.

10. An apparatus of claim 6, wherein the apparatus is further caused to:
  initiate transmission of the non-real time data to an application server to occur concurrently with reception of application data from the application server.

11. An apparatus of claim 6, wherein the apparatus is a mobile phone further comprising:
  user interface circuitry and user interface software configured to facilitate user control of at least some functions of the mobile phone through use of a display and configured to respond to user input; and
  a display and display circuitry configured to display at least a portion of a user interface of the mobile phone, the display and display circuitry configured to facilitate user control of at least some functions of the mobile phone.

* * * * *